United States Patent [19]

Hooper et al.

[11] Patent Number: 4,642,015
[45] Date of Patent: Feb. 10, 1987

[54] BEARING SUPPORT FOR DISCHARGER MECHANISM

[75] Inventors: Anthony W. Hooper, Montreal, Canada; Alexander D. Cormack, Marietta, Ga.; Pierre Marchand, Rock Forrest, Canada

[73] Assignee: Uniweld Inc., Sherbrooke, Canada

[21] Appl. No.: 621,259

[22] Filed: Jun. 15, 1984

[51] Int. Cl.⁴ .............................................. B65G 25/04
[52] U.S. Cl. ...................................... 414/325; 198/741
[58] Field of Search ................ 414/304, 325; 198/737, 198/741, 747; 308/3 R

[56] References Cited

U.S. PATENT DOCUMENTS

| | | | |
|---|---|---|---|
| 2,417,128 | 3/1947 | Roesch | 198/741 |
| 2,835,539 | 5/1958 | Conrad | 308/DIG. 7 |
| 3,525,446 | 8/1970 | Grafstrom | 198/741 X |
| 3,797,637 | 3/1974 | Wissmann | 198/747 |
| 3,802,552 | 4/1974 | Gann et al. | 198/741 |
| 3,923,149 | 12/1975 | Stearns | 198/747 |
| 4,157,761 | 6/1979 | Debor | 414/304 |
| 4,594,045 | 6/1986 | Hooper et al. | 414/325 |

OTHER PUBLICATIONS

Brochure for Hooper SR Discharger, Copyright 1982.

*Primary Examiner*—Robert J. Spar
*Assistant Examiner*—Stuart J. Millman
*Attorney, Agent, or Firm*—Larson and Taylor

[57] ABSTRACT

A discharger mechanism is provided for discharging solids from the bottom of a pile. The discharger comprises a reciprocating stoker rod of a substantially rectangular cross section and plastimeric bearing member engaging the bottom and sides of the rod for vertically supporting and horizontally guiding the rod. A reciprocating device reciprocates the rectangular stoker rod longitudinally beneath the pile. A plurality of stoker cross bars are equispaced apart and rigidly attached at their centers to the rectangular stoker rod. A further bearing member bears against the top of rod to prevent the rod from lifting.

3 Claims, 6 Drawing Figures

BEARING SUPPORT FOR DISCHARGER MECHANISM

FIELD OF THE INVENTION

The present invention relates to a discharger mechanism for discharging solid material such as granular materials, pellets, chips, and the like from the bottom of a pile or from a bin or hopper.

BACKGROUND OF THE INVENTION

Discharger mechanisms sometimes referred to as feeder mechanisms or stoker mechanisms, are well known. U.S. Pat. No. 4,157,761 (Debor) discloses one type of discharger mechanism comprising a single round stoker rod, or plural round stoker rods having a plurality of stoker cross bars attached thereto at the midpoints of the cross bars. Although the patent suggests that the round cross section of the stoker rod may be replaced by a rectangular or other shaped cross section, all of the embodiments described and illustrated therein relate to stoker rods of round cross section and there is no recognition therein of the problems associated with the use of round stoker rods. For example, such round rods or bars must be machined before the stoker cross bars are mounted thereon. Further, such round stoker rods tend to roll and cause the cross bars to come into contact with the floor of the stoker chamber. In addition, round stoker rods are subject to lifting caused by compaction of fines underneath the rod. For example, if the discharger mechanism is located in a trough, the fines fall into the trough and pack on the lower half of the circumference of the rod thereby causing the rod to lift. This eventually causes mechanical damage to the stoker through wear, thus necessitating expensive repairs. Further, a round rod requires a machined bearing underneath the rod and a great number of bearings are required due to the resulting high bearing pressure per square inch.

SUMMARY OF THE INVENTION

In accordance with the present invention there is provided an improved discharger mechanism which basically comprises a stoker rod having a rectangular cross section extending beneath a pile, longitudinally extending bearing means engaging the bottom and sides of the rod for vertically supporting and horizontally guiding the rod, reciprocating means for longitudinally reciprocating the rod, and a plurality of stoker cross bars equispaced apart and rigidly attached at their centers to the stoker rod.

The stoker rod of rectangular cross section provides a greater surface area for mounting the stoker cross bars than a round rod and the mounting can be provided without machining of the rod. Such a stoker rod does not roll and cause the cross bars to contact the floor of the stoker. Further, with a stoker rod of rectangular cross section, fines which fall down the side of the rod do not compact underneath the rod. In fact, such compaction occurs on the sides of the rod only and such compaction of fines on the sides of the rod does not result in lifting of the rod. Further, a flat bearing may be used with the rod, so that rod of rectangular cross section wear is distributed over a greater area than with a round rod, thereby resulting in lower bearing pressure per square inch and necessitating fewer bearings. Moreover, the combination of the stoker rod of rectangular cross section and bearing means providing vertical support and horizontal guiding of the rod, enables the elimination of seal strips which were heretofore used to close the trough. The discharger thus is operable with the trough open to the material above so that the discharger unit is less expensive to build and more readily accessible for maintenance should the need arise. Thus, the discharger mechanism of the present invention has a significantly improved operating efficiency compared to prior art discharger mechanisms.

Other features and advantages of the invention will be set forth in, or apparent from, the detailed description of a preferred embodiment which follows.

BRIEF DESCRIPTION OF THE DRAWINGS

In the drawings which illustrate preferred embodiments of the invention.

DESCRIPTION OF THE PREFERRED EMBODIMENTS

Figure 1:
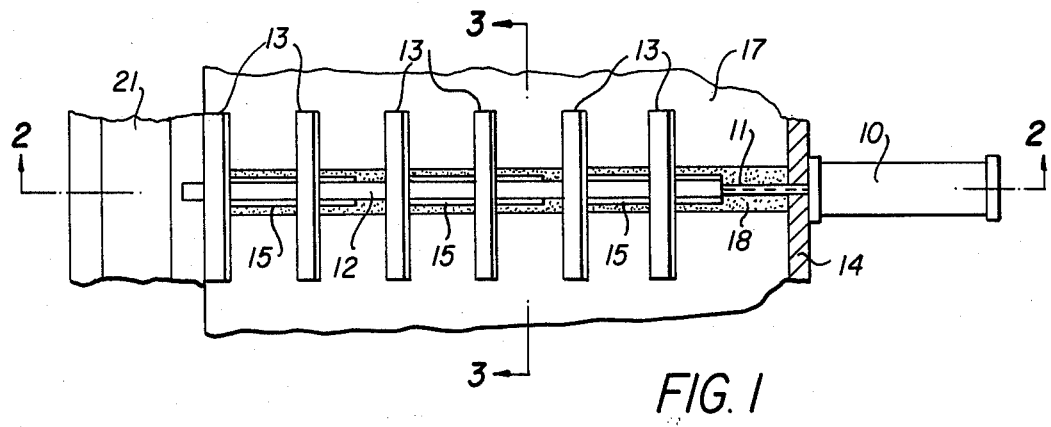
FIG. 1 is a top plan view of a discharger mechanism constructed in accordance with one embodiment of the present invention.
Figure 2:
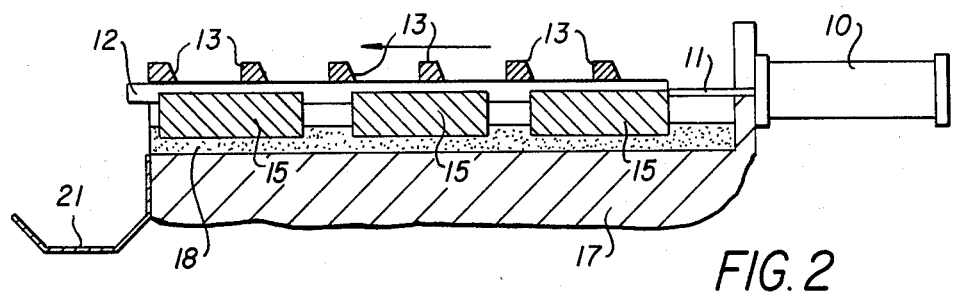
FIG. 2 is a side elevation, partially in cross section, of the discharger mechanism shown in FIG. 1 taken generally along the line 2—2 of FIG. 1.
Figure 3:
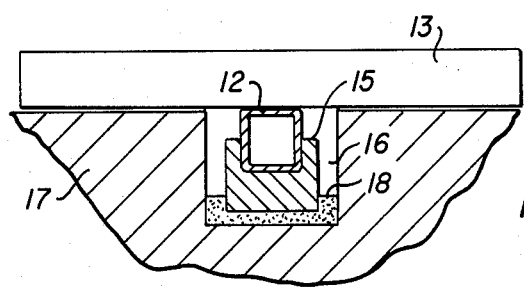
FIG. 3 is an axial cross section of the discharger mechanism shown in FIG. 1 taken generally along line 3—3 of FIG. 1.

Referring to FIGS. 1-3, a discharger mechanism is shown which includes a hydraulic cylinder 10 with a piston rod 11 connected to a stoker rod 12 of rectangular cross section. The rod 12 of rectangular cross section may be hollow or solid. Mounted transversely on, and substantially equispaced along, stoker rod 12 are a plurality of stoker cross bars 13 attached at their midpoint to rod 12. The flange of the cylinder 10 is mounted on a thrust member 14 and which takes the full force from the cylinder when the stoker rod 12 is being pushed or pulled. Depending on requirements, thrust member 14 can be anchored to a firm base. The stoker rod 12 rests on a plurality of bearings 15 which are set in a trough or cavity 16 in a floor 17 of a hopper or bin or beneath the pile of material to be discharged. As shown, the discharger mechanism can be designed to discharge onto a conveyor 21. Preferably, the stoker rod 12 also rests in cavity 16 and the cross bars 13 are attached to the top portion of stoker rod 12 so they are located just above the floor 17 of the hopper or bin.

Figure 4:
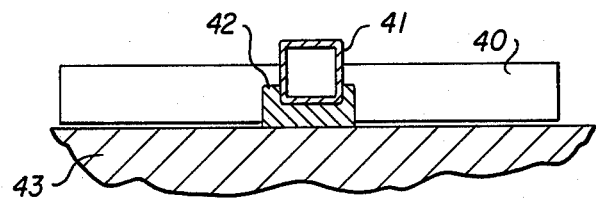
FIG. 4 is an axial cross section of another embodiment of the invention.

In another embodiment of the invention illustrated in FIG. 4, the discharge mechanism is located beneath a pile of material and does not rest in a cavity in a hopper or bin. Cross bars 40 are attached to a stoker rod 41 of rectangular cross section and stoker bearing blocks 42 are positioned on the floor or ground 43 between the cross bars 40. With this arrangement, no trough or cavity is necessary underneath the pile or in the floor 43 of the hopper or bin. In yet another embodiment, the cross bars 40 may be attached above the stoker rod 41 with no trench or cavity provided in the ground or floor 43.

An important feature of the present invention is that the bearing arrangement formed by bearing blocks 15 in FIGS. 2-3 (and bearing blocks 42 in FIG. 4) supports the stoker rod 12 (and 41) vertically and guides the rod horizontally. In the embodiment of FIGS. 1-3, the bearing blocks 15 may be set in cavity 16 using grout 18. The bearing blocks 15 are preferably fabricated of a known plastic polymeric material, so that lubrication is not required. In a specific non-limiting example, the bearing sections 15 are approximately 12 to 18" long and are installed on 30 to 40" centers, although it is contemplated that a single bearing member could be used to support and guide the rod along its entire length. Bearing blocks or sections 15 support the underside or bottom of the rod 12 substantially across the entire width thereof and, in a preferred embodiment, guide the rod roughly up to the midpoint of the vertical sides of the rod.

Figure 6:
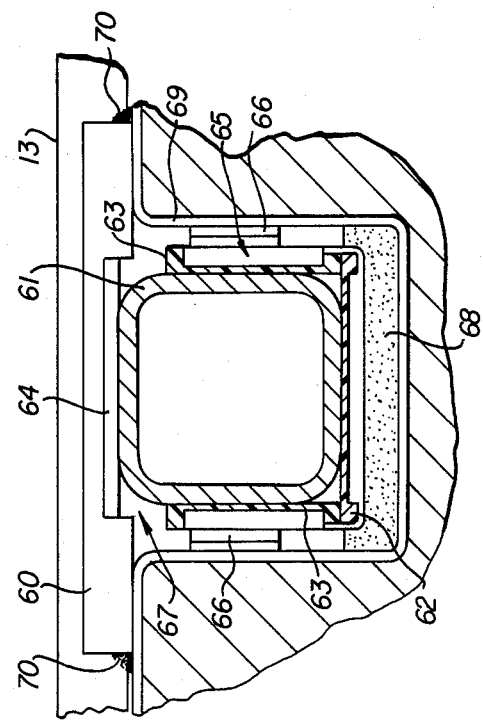
FIG. 6 is an axial cross section of yet another embodiment of the invention.
Figure 5:
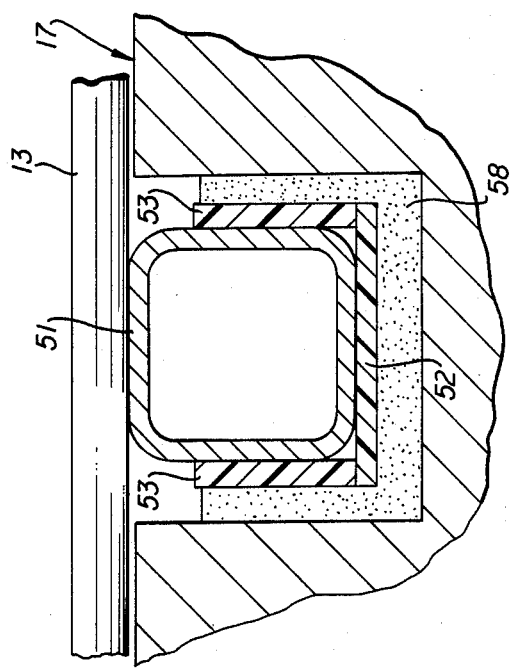
FIG. 5 is an axial cross section of a further embodiment of the invention.

Referring to FIGS. 5 and 6, alternative, preferred bearing arrangements are shown. With reference to FIG. 5, separate side bearings 53 and a horizontal support bearing 52 horizontally guide and vertically support a stoker rod 51 of rectangular cross section. Bearings 52 and 53 are set in grout 58 and are preferably made of a plastic polymeric material. Preferably, the bearings are supported in a bearing retainer (not shown) of the type illustrated in FIG. 6, with the bearing retainer being grouted into the trough. The bearings 52, 53 may be located intermittently along the length of the rectangular rod 51 or alternatively, as discussed above, a single bearing formed by bearings, 52, 53 can be used to support the entire length of the rod. Preferably, the bearing or bearings are formed by strips or sheets of the plastic polymeric material.

Referring to FIG. 6, a further embodiment is illustrated wherein the bearing assembly for a stoker rod 61 comprises a bottom support bearing 62 and a pair of side bearings 63 which are held in place using a generally U-shaped steel bearing retainer 65 which is grouted into trough 67 by grout 68. The overall bearing assembly is supported by a U-shaped bearing support member 69 which is grouted into trough 67. Metal wedges 66 are inserted between the sides of bearing retainer 65 and the sidewalls of bearing support member 9, and welded, as illustrated. In a preferred embodiment, a further, hold down bearing 64 is disposed on the top of the stoker rod 61 at one or both ends thereof and functions to positively prevent rod 61 from lifting. Bearing 64 is held in place by a further bearing retainer 60 which is welded to the flanges of bearing support member 69 by welds 70. Bearing 64 preferably comprises a sheet or strip of plastimeric polymer.

As noted above, the combination of a stoker rod of rectangular cross section with the vertical support and horizontal guidance provided by the bearing arrangement of the invention enables the use of a trough without the need for the seal strips which were previously used to close the trough. In an alternative embodiment, the discharger mechanism of this invention may be equipped with hold down bars and seal strips in accordance with the teaching of our copending application Ser. No. 621,260, filed on even date herewith and now U.S. Pat. No. 4,594,045.

In operation, referring to FIGS. 1-3 as exemplary, the discharger mechanism reciprocates under the control of hydraulic cylinder 10 and during each stroke the cross bars 13 (FIG. 1) push a layer of material resting between the cross bars towards the discharge outlet. As is well known to those skilled in the art, the stoker rod may be equipped wtih fixed floor angles, the discharger mechanism may be adapted to accommodate discharge outlets positioned at either or both ends or the center relative to the stoker rod, and two or more discharger mechanisms may be adapted to operate in tandem as disclosed in U.S. Pat. No. 4,157,761.

It will be understood that various changes may be made to the embodiments shown herein without departing from the scope of the invention. For example, the hydraulic cylinder disclosed in the illustrated embodiment of the invention may be replaced in any suitable type of reciprocating mechanism such as an electric solenoid, a rack and pinion, or pneumatic reciprocating mechanisms. The discharger mechanism may be used in many different applications including the discharge of materials such as piles of bark or chips in paper mills, rocks, resins, salt, sand, various types of sludges, and cooked or raw foods. In fact, the discharger mechanism may be used with almost any solid material that can be piled up on itself and is not damaged by the reciprocating motion of the discharger mechanism. Since the mechanism discharges the first material fed to it, there is no opportunity for deterioration of the stored material in the pile.

The embodiments of the invention in which an exclusive property or privilege is claimed are defined as follows:

1. A discharger mechanism for discharging solid material from the underside of a pile disposed on the floor of a hopper, said discharger mechanism comprising,
   a stoker rod having a rectangular cross section disposed in a trough in the floor of the hopper,
   a plurality of stoker cross bars rigidly attached at the centers thereof to said stoker rod and being substantially equispaced along the length of the rod,
   reciprocating means for longitudinally reciprocating said stoker rod,
   at least one generally U-shaped bearing retainer disposed in said trough extending beneath said stoker rod and along the sides of said stoker rod,
   bearing means comprising a plurality of sheets of plastic polymeric material removably disposed on each of said U-shaped bearing retainers, said plurality of sheets comprising separate plastic sheets being in contact with the bottom surface and each of the side faces of said stoker rod respectively,
   at least one hold down bearing means each including a separate sheet of plastic polymeric material disposed on top of the upper surface of the stoker rod to prevent said stoker rod from lifting and
   grout disposed between said bearing retainer and the trough in the floor of the hopper across the bottom and portions of the side walls of said bearing retainer to retain said bearing retainer in a fixed position in said trough and to maintain said stoker cross bars in spaced relation to the floor of the hopper.

2. A discharger mechanism according to claim 1 wherein a plurality of said bearing retainer and said bearing means are disposed in said trough in spaced relation along the length of said stoker rod.

3. A discharger mechanism according to claim 1 and further including wedge means disposed between the U-shaped bearing retainer and the trough in the floor of the hopper.

* * * * *